United States Patent
Clark, Jr. et al.

(10) Patent No.: US 7,753,755 B2
(45) Date of Patent: Jul. 13, 2010

(54) WALL RACER TOY VEHICLES

(76) Inventors: Leonard R. Clark, Jr., 128 Weldy Ave., Oreland, PA (US) 19075; H. Peter Greene, Jr., 12 Wards Way, Boyertown, PA (US) 19512

( * ) Notice: Subject to any disclaimer, the term of this patent is extended or adjusted under 35 U.S.C. 154(b) by 1366 days.

(21) Appl. No.: 11/177,428

(22) Filed: Jul. 11, 2005

(65) Prior Publication Data

US 2006/0144624 A1    Jul. 6, 2006

Related U.S. Application Data

(60) Provisional application No. 60/640,041, filed on Dec. 30, 2004.

(51) Int. Cl.
*A63H 30/00* (2006.01)

(52) U.S. Cl. .................. 446/454; 446/117; 446/178

(58) Field of Classification Search .................. None
See application file for complete search history.

(56) References Cited

U.S. PATENT DOCUMENTS

| | | | |
|---|---|---|---|
| 3,246,711 A * | 4/1966 | Snoeyenbos | 180/164 |
| 3,810,515 A * | 5/1974 | Ingro | 180/54.2 |
| 3,926,277 A * | 12/1975 | Shino et al. | 180/164 |
| D238,798 S | 2/1976 | Goldfarb | |
| 4,386,801 A | 6/1983 | Chapman | |
| D274,344 S | 6/1984 | Boudreaux | |
| 4,459,776 A | 7/1984 | Jaworski | |
| 4,470,219 A | 9/1984 | Sugimoto | |
| 4,813,906 A | 3/1989 | Matsuyama et al. | |
| 4,971,591 A * | 11/1990 | Raviv et al. | 446/177 |
| 5,014,803 A | 5/1991 | Urakami | |
| D332,978 S | 2/1993 | Tsuchiya | |
| D332,979 S | 2/1993 | Tsuchiya | |
| 5,194,032 A * | 3/1993 | Garfinkel | 446/178 |
| D369,839 S | 5/1996 | Tibor et al. | |
| 5,536,199 A | 7/1996 | Urakami | |
| D403,023 S | 12/1998 | Araki | |

(Continued)

FOREIGN PATENT DOCUMENTS

CN    200970474 Y    11/2007

(Continued)

OTHER PUBLICATIONS

Lauda, "The New Formula One: A Turbo Age" (1984), pp. 39 and 42.

*Primary Examiner*—Ronald Laneau
*Assistant Examiner*—Tramar Harper
(74) *Attorney, Agent, or Firm*—Michael de Angeli

(57) ABSTRACT

A motorized toy vehicle or Wall Racer that is capable of operating on vertical and inverted horizontal surfaces such as walls and ceilings, while being manufacturable at reasonable cost and operable on batteries having sufficient lifetime as to be enjoyable. One or more battery-powered fans draw air from around all or defined portions of the periphery of the interior volume of the Wall Racer through a carefully-shaped duct, so that the air in the portion of the duct immediately adjacent the surface flows at high velocity and low pressure; the relatively greater pressure of the surrounding air urges the vehicle against the surface, allowing it to adhere to vertical surfaces, such as walls, or operated inverted on horizontal surfaces, such as ceilings.

24 Claims, 8 Drawing Sheets

U.S. PATENT DOCUMENTS

| | | |
|---|---|---|
| 6,554,241 B1 | 4/2003 | Leshem |
| 6,582,275 B1 | 6/2003 | Lai |
| 6,641,457 B1 | 11/2003 | Lai |
| 6,840,839 B2 | 1/2005 | Rehkemper et al. |
| D524,880 S | 7/2006 | Yuen |
| D532,835 S | 11/2006 | Suimon |
| D534,967 S | 1/2007 | Clark et al. |
| D572,773 S | 7/2008 | Horikoshi |
| D572,774 S | 7/2008 | Horikoshi |
| D577,083 S | 9/2008 | Nakayama |
| 2002/0160688 A1 | 10/2002 | Rehkemper et al. |

FOREIGN PATENT DOCUMENTS

| | | |
|---|---|---|
| GB | 2269142 | 7/1993 |

\* cited by examiner

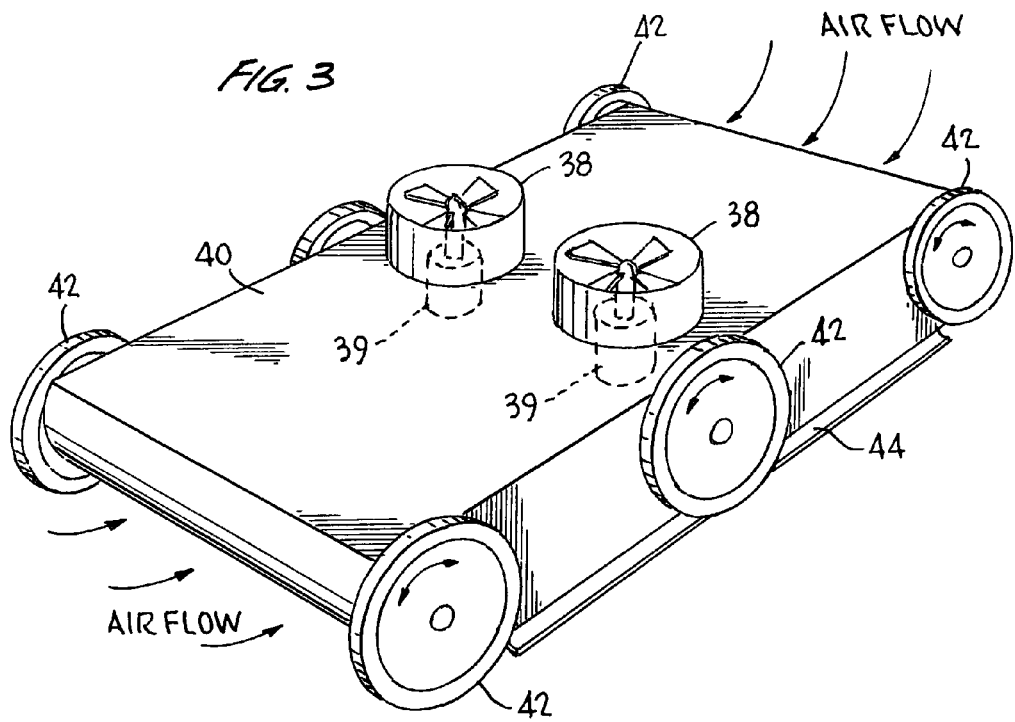
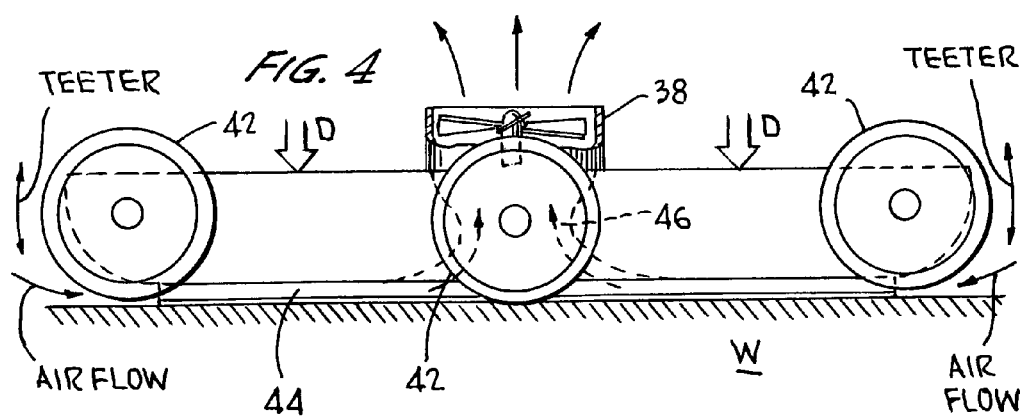

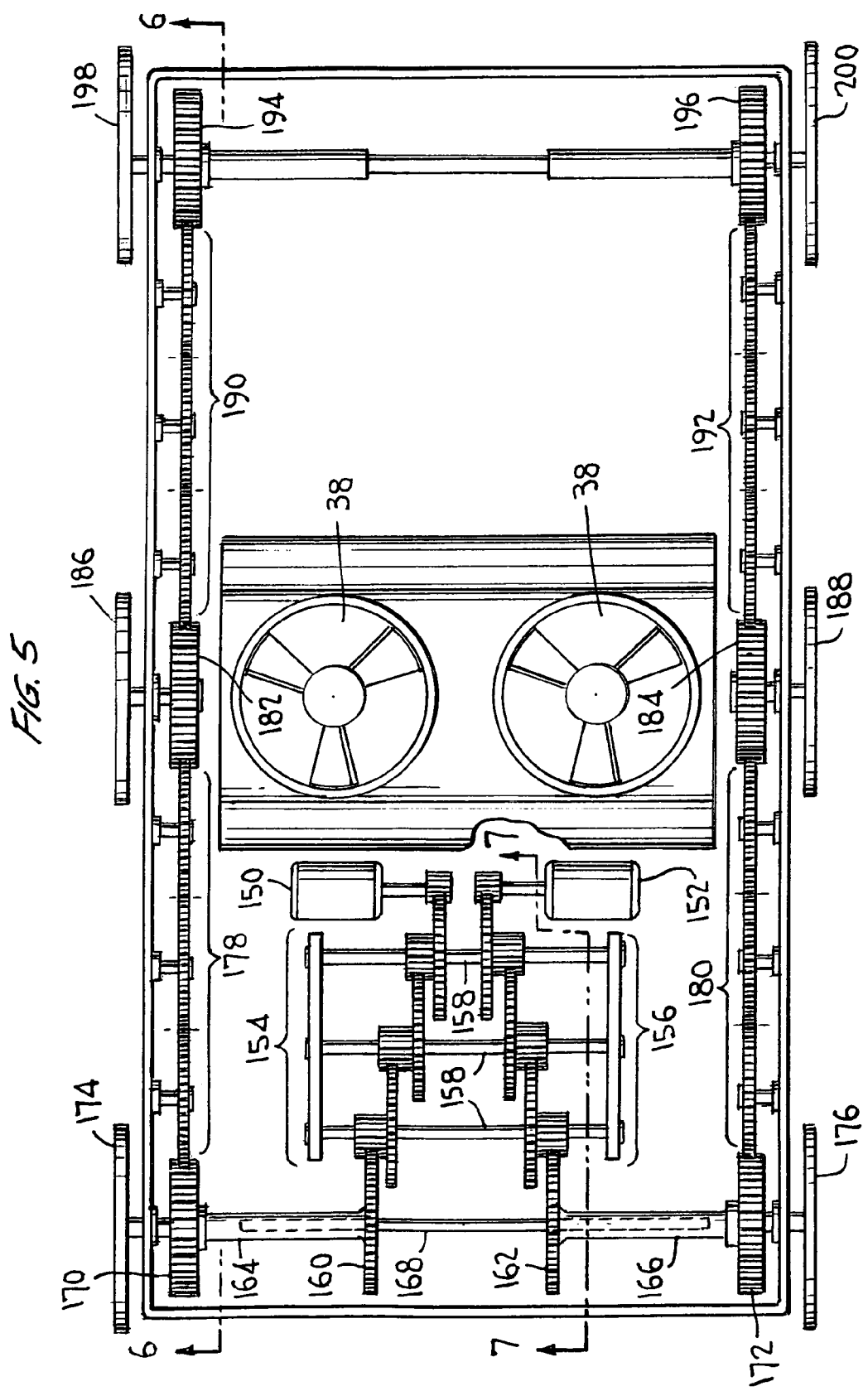

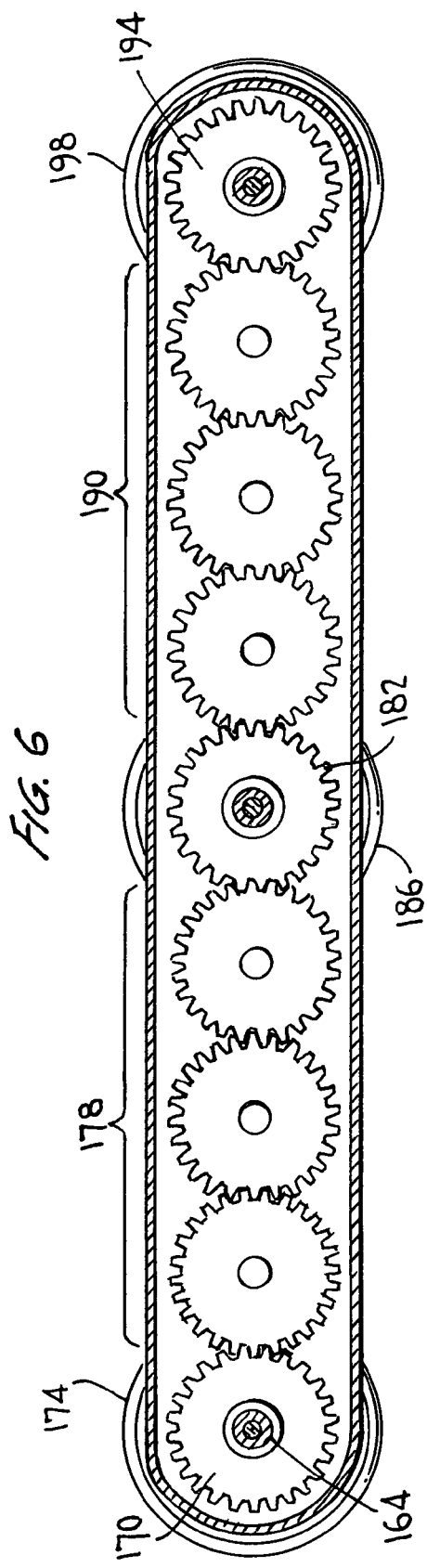
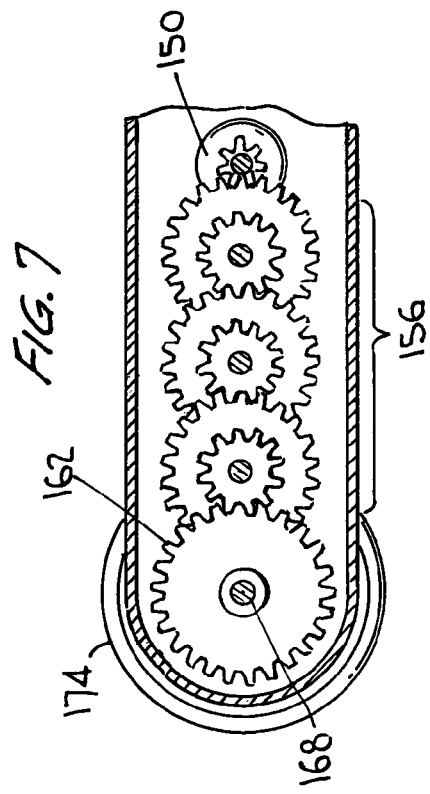

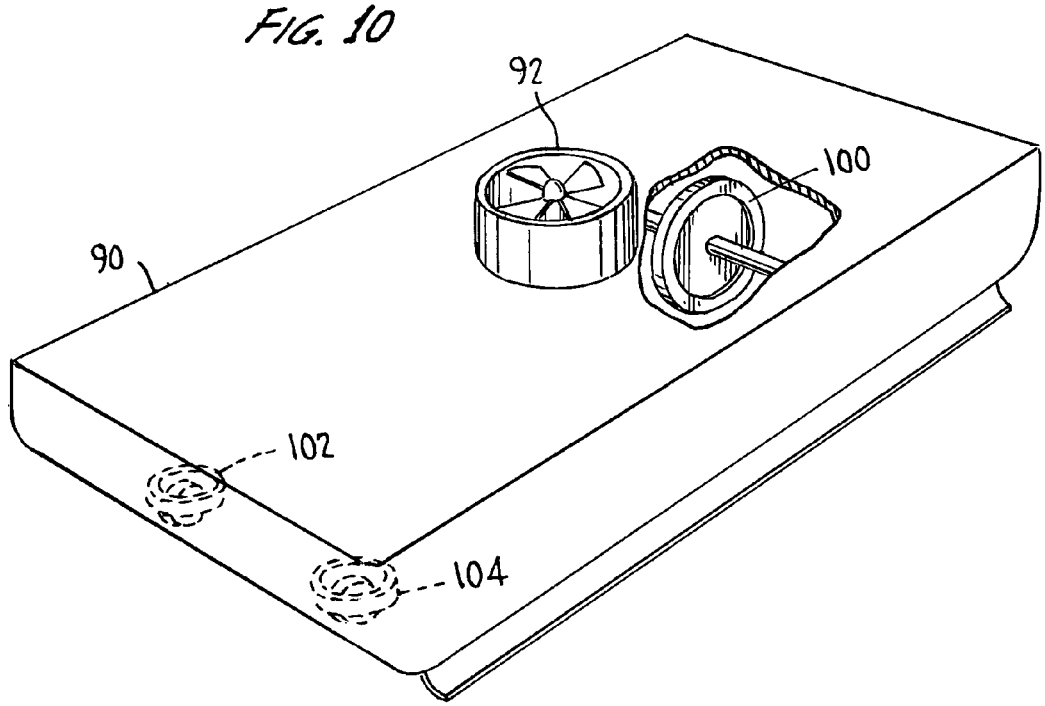
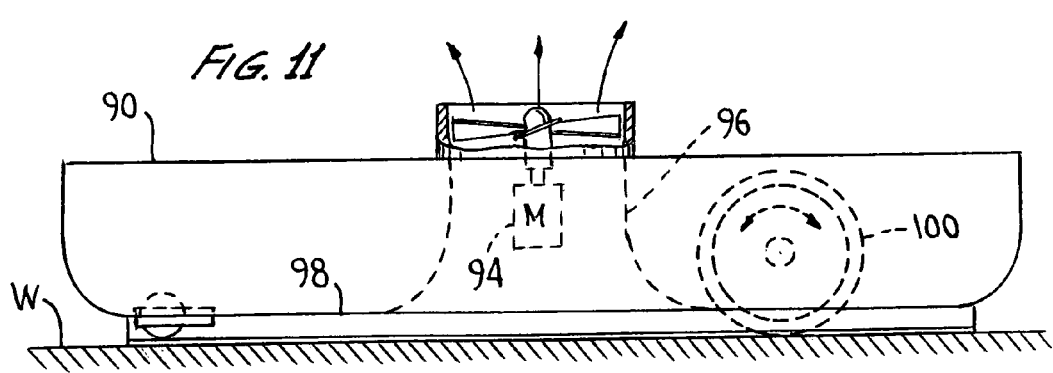

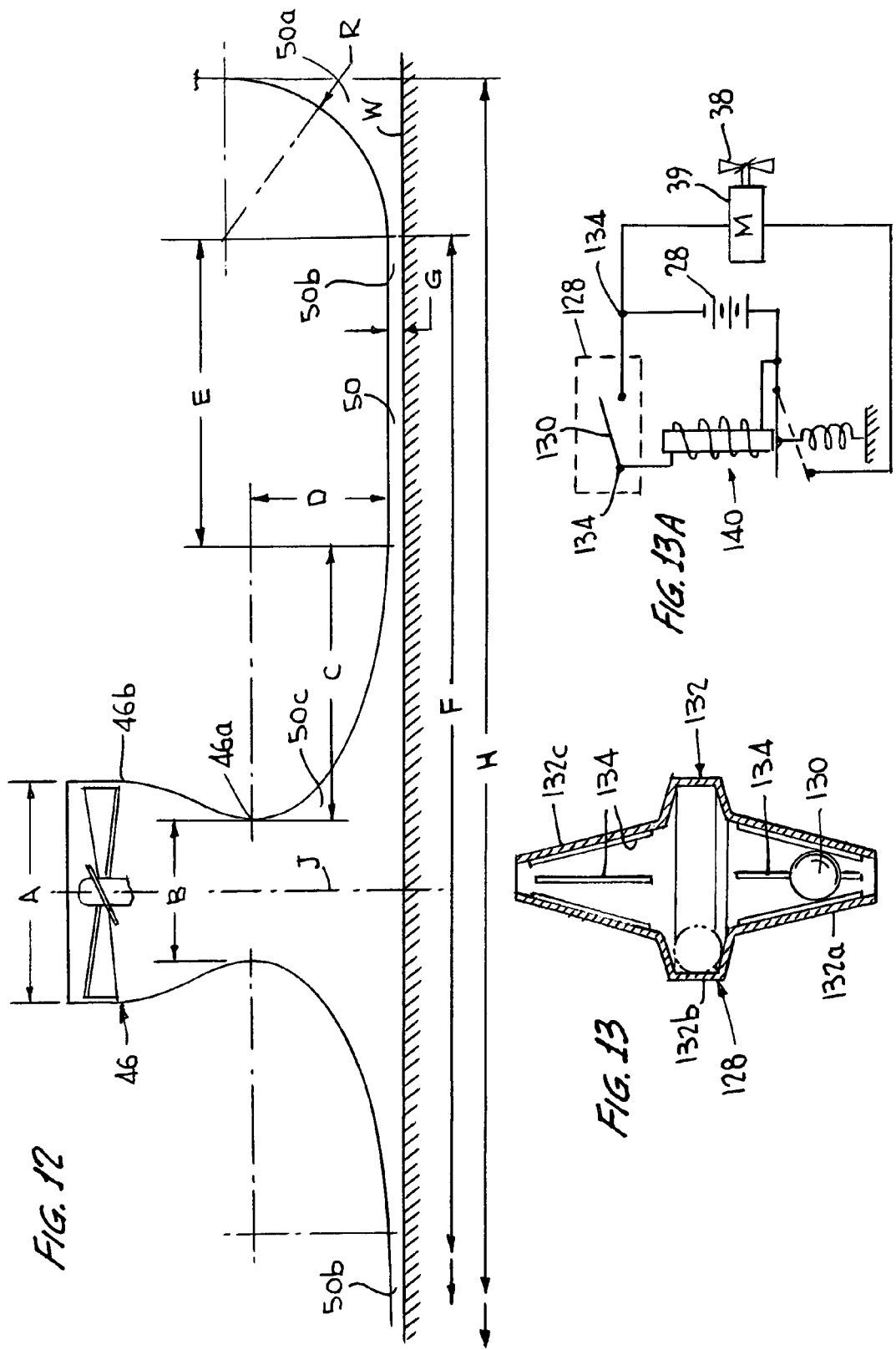

ical application 60/640,041, filed Dec. 30, 2004.

WALL RACER TOY VEHICLES

CROSS-REFERENCE TO RELATED APPLICATION

This application claims priority from U.S. provisional application 60/640,041, filed Dec. 30, 2004.

FIELD OF THE INVENTION

This invention relates to radio-controlled motorized toy vehicles capable of operation on surfaces of all orientations, e.g., walls and ceilings as well as floors.

BACKGROUND OF THE INVENTION

Radio-controlled motorized toy vehicles, that is, vehicles driven by motors and steered responsive to commands transmitted remotely, are of course well-known. Toy vehicles that are very sophisticated in terms of their suspension and steering systems are available and are very popular. A toy vehicle that operated other than on essentially horizontal surfaces, e.g., which could operate on a vertical wall, or inverted on a ceiling, and which could be made and sold at a competitive price, would be very desirable.

U.S. Pat. No. 5,014,803 to Urakami shows a device for "suction-adhering" to a wall and moving along the wall, e.g. for cleaning the interiors of tanks and the like. The Urakami device relies on a relative vacuum; that is, air is drawn by a vacuum pump out from a sealed volume formed between the interior of the device and the wall, so that air pressure on the outer surface of the device forces it against the wall. This necessitates that an essentially air-tight seal be formed around the periphery of the device. Forming an air-tight seal between a moving device and a fixed surface is not a simple problem, and the Urakami patent is directed primarily to such seals. The obvious problems to be overcome are friction between the sealing member and the wall, which impedes motion of the device and causes wear of the sealing members, loss of vacuum at irregularities in the surface, and the large amount of power required to form an effective vacuum. This approach is not satisfactory for a toy vehicle that must be durable when operated by children and be able to be operated for a sufficiently long time with a limited amount of battery capacity to not frustrate the user.

SUMMARY OF THE INVENTION

The present invention provides a motorized toy vehicle that is capable of operating on vertical and inverted horizontal surfaces such as walls and ceilings, while being manufacturable at reasonable cost and operable on batteries having sufficient lifetime as to be enjoyable. The vehicle of the invention, referred to hereinafter as the Wall Racer, employs a freely-flowing stream of air between the surface-abutting periphery of the interior volume of the vehicle to create a pressure differential with respect to the surrounding air, so that the pressure of the surrounding air urges the Wall Racer against the surface.

More specifically, one or more battery-powered fans draw air from around all or defined portions of the periphery of the chassis of the Wall Racer through a carefully-shaped duct formed between the undersurface of the chassis and a juxtaposed surface, so that the air in the portion of the duct immediately adjacent the surface flows at high velocity. According to Bernouilli's Principle, this high-velocity air stream is of low pressure; the differential between this low-pressure air stream and the relatively greater pressure of the surrounding air urges the vehicle against the surface, allowing it to adhere to vertical surfaces, such as walls, or be operated inverted on horizontal surfaces, such as ceilings. The differential pressure thus urging the vehicle against the surface is referred to hereinafter, as in the automotive industry, as "downforce". Because the air stream must be freely flowing to attain high velocity, seals such as required for wall-climbing vehicles employing a vacuum (and which make it very difficult to provide workable vehicles, as above) are unnecessary. Indeed, entry of the air into the duct formed between the undersurface of the chassis and the juxtaposed surface is essential, and is controlled carefully to ensure stable, and insofar as possible non-turbulent flow.

It would be of self-evident amusement interest, or "toy value", to provide a radio-controlled vehicle capable of making the transition between operation on a floor to climbing a wall, and the Wall Racer in certain embodiments can do so. In order that the vehicle can make the transition, the fan(s) driving the air stream are actuated only when the vehicle begins to climb the wall.

Other inventive aspects of the Wall Racer will appear as the discussion below proceeds.

BRIEF DESCRIPTION OF THE DRAWINGS

The invention will be better understood if reference is made to the accompanying drawings, in which:

FIG. 3 and FIG. 4 show respectively a perspective view and an elevation in partial cross-section of a second embodiment of the Wall Racer;

FIGS. 5, 6, and 7 show views of a gear train employed in the embodiment of FIGS. 3 and 4;

FIG. 10 and FIG. 11 show respectively a perspective view and an elevation in partial cross-section of a fourth embodiment of the Wall Racer;

FIG. 12 shows a detailed diagram of one successful shape for the duct employed to form the high-velocity air stream, e.g., as employed in the second embodiment of FIGS. 3 and 4;

FIG. 13 shows a cross-sectional view of a switch employed to actuate the fans when the Wall Racer transitions from floor to wall operation, and which prevents its operation inverted on a ceiling, for safety reasons, while FIG. 13A shows a typical circuit in which it may be used; and FIGS. 14, 15, and 16 show respectively a perspective view, an elevation in partial cross-section, and an enlarged cross-section of a caster used in several of the embodiments of the Wall Racer, while

DESCRIPTION OF THE PREFERRED EMBODIMENTS

It will be apparent that one type of Wall Racer toy vehicle that would be desirably offered is one resembling an automobile, for example a race car, while other sorts of vehicles, such as trucks or military vehicles, e.g., armored tanks, might also be of interest. The first, second and fourth embodiments of the Wall Racer discussed herein are of generally elongated shape, so as to be fitted with model automobile bodies not otherwise contributing to the operation of the Wall Racer, while the third embodiment is circular and might be made to resemble a "flying saucer" type of space vehicle. All of these embodiments operate similarly, with differences as occasioned by the differing body shapes.

Figure 1:
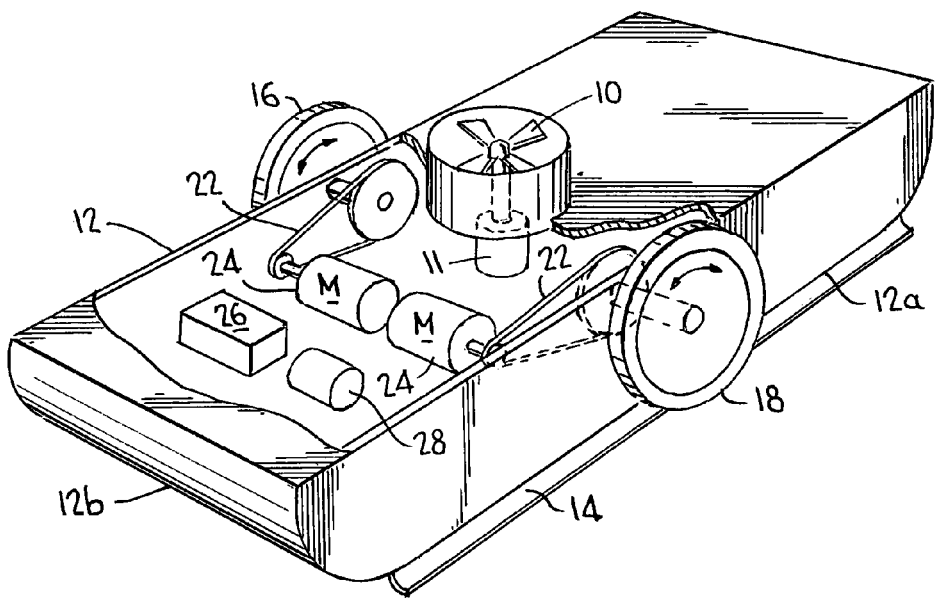
FIG. 1 and FIG. 2 show respectively a perspective view and an elevation in partial cross-section of a first embodiment of the Wall Racer.
Figure 2:
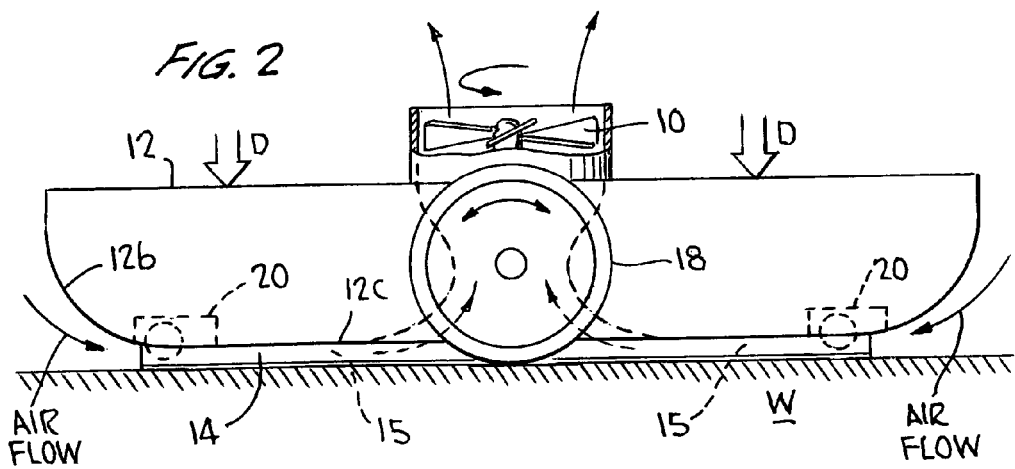

For example, FIGS. 1 and 2 show respectively a perspective and an elevation in partial cross-section of a first embodiment of the Wall Racer, which as noted is generally elongated and could readily be fitted with a model race car or other vehicle body (not shown). As mentioned above, in order that downforce urging the Wall Racer against an abutting surface W (hereinafter simply "the wall") can be developed, a high velocity stream of air is induced to flow in an underbody venturi duct formed between the undersurface of the chassis of the Wall Racer and the wall W. According to Bernouilli's Principle, as above, such a high velocity stream of air will be of reduced pressure with respect to the ambient air. The differential between this reduced pressure and the surrounding atmospheric pressure generates a resultant force D, termed "downforce" where, as here, its direction is such as to urge the vehicle "downwardly" toward the wall W. The amount of downforce D developed is proportional to the area over which the low pressure is created, and to the differential in pressure per unit area, so this area and the differential pressure must be adequate for the purpose.

Thus, as illustrated in FIGS. 1 and 2, a fan 10 is mounted in a fan duct extending through the chassis 12, and is driven by a battery-powered motor 11 so as to draw a high-velocity stream of air in from around at least a portion of the periphery of chassis 12. The stream of air flows through an underbody venturi duct 15 formed between the underside of chassis 12 and the juxtaposed surface of wall W, and is exhausted on the "upper" side of chassis 12, that is, on the side away from the abutting wall W. Downforce D is created as noted due to the differential in pressure between the low pressure of the high-velocity air stream in the underbody venturi duct and the ambient air; as noted, the total amount of downforce is proportional to the area over which the low pressure is developed, and to the differential in pressure at each point.

To maximize the area of low pressure by avoiding air being drawn in along the edges 12a of the chassis 12, that is, to ensure that the air stream is principally drawn in at the ends 12b of the chassis 12, flexible skirts 14 extend from the chassis 12 toward wall W and form a partial seal therebetween, limiting "short-cutting" of air from the sides of the chassis juxtaposed to the fan duct. The skirts thus define one or more, in this case two, sections of the periphery of the underbody of the chassis at which air is drawn into an entry portion of the underbody venturi duct, which directs airflow into the fan duct. Accordingly, air is drawn in primarily at the ends 12b, which are provided with a broad radius to ensure smooth and insofar as possible non-turbulent airflow; for similar reasons, the undersurface 12c of the chassis 12 is smooth. Thus the high-velocity air stream extends for a substantial portion of the overall length of the chassis, ensuring that adequate downforce is developed.

By comparison, in the generally circular third embodiment of the Wall Racer shown in FIGS. 8 and 9 (discussed further below) a substantial distance exists between all points on the outer periphery of the undersurface of its chassis and the centrally-located exhaust duct, so that the airflow in this embodiment is radially inwardly from all directions, the downforce is developed uniformly around the chassis, and no skirts need to be fitted.

As noted, the differential in pressure and thus the downforce developed is a function of the air velocity, which up to a point can be increased by reducing the cross-sectional area of the duct formed between the underside of the chassis and the wall W, that is, by reducing the ground clearance of the Wall Racer. However, if the cross-sectional area is reduced too much, turbulence will impede flow and reduce the desired effect; reducing the ground clearance would also increase the Wall Racer's sensitivity to surface irregularities and the like. No detailed theoretical calculations have as yet been carried out which would allow optimization of the effect sought. For example, by optimizing the duct design the current draw of the motor powering the fan inducing the flow could perhaps be reduced, increasing operating time per battery charge. Detailed specifications of the duct and other components employed in a successfully-tested embodiment of the Wall Racer are provided below.

Returning to discussion of the first embodiment of FIGS. 1 and 2, as illustrated the chassis 12 is supported by two opposed drive wheels 16 and 18, spaced transversely from one another on either side of the chassis near the midpoint thereof, and by opposed casters 20 (that is, devices comprising freely-rotating wheels mounted for pivoting about an axis perpendicular to their axis of rotation) at either end of the chassis 12. As indicated schematically by belt drives 22, the opposed drive wheels 16 and 18 are separately powered by motors 24 that are supplied with current by a battery pack 28 in response to control signals provided by radio-controlled receiver 26. The overall construction and operation of these components is conventional except as noted and will not be discussed in detail herein. Thus, if both motors are controlled to drive wheels 16 and 18 in the same direction, the Wall Racer moves in that direction, while turning is accomplished by driving the wheels 16 and 18 in differing directions or at differing rates. Casters 20 are unpowered, mounted on the longitudinal centerline of chassis 12, and simply serve to maintain the correct spacing between undersurface 12c of chassis 12 and wall W; preferred locations and design of casters 20 are discussed below.

The "differential" drive scheme shown is preferred over, for example, a conventional four-wheel chassis, with one pair of wheels powered and one pair steering, for the following reasons. In order that a vehicle can climb a vertical wall, sufficient downforce must be exerted, urging the vehicle toward the wall, not only to support the vehicle against the force of gravity but also to provide sufficient traction to propel the vehicle vertically against gravity. (By comparison, providing a vehicle that operates inverted on a ceiling is simplified, since it need only support itself and need not also climb vertically.) Ensuring good traction thus becomes paramount. So as to maximize the traction provided by the downforce available, the drive wheels are located centrally, at the center of the pressure exerted by the downforce, so that essentially all of the downforce is transmitted directly to the drive wheels, maximizing traction.

The casters 20 are preferably mounted so that both do not simultaneously touch a flat surface, so that a three-point support is always available, with the drive wheels 16 and 18 forming two of the three contact points. The motion thus provided, whereby the vehicle can rock slightly back and forth about the axis of the drive wheels 16 and 18, as one or the other of casters 20 touches the wall W, is referred to as "teeter" herein. Thus the downforce is balanced over the central drive axle, which maximizes traction, while allowing the vehicle to be steered by differential driving of the opposed drive wheels 16 and 18.

By comparison, if a four-wheel drive arrangement were employed, i.e., with four driven wheels at the corners of a rectangular chassis, the total traction provided for a given amount of downforce would be equal to that obtained with the Wall Racer as shown, but the four-wheel arrangement would be much more sensitive to any irregularities in the surface. Further, such a vehicle, involving steering of at least two wheels and drive to all four, would be much more complicated, heavy, and expensive. Finally, such an arrangement would involve resistance to turning due to "tire scrub", that is, frictional resistance caused by the different effective turning radii of the "contact patch" across the tread of each tire. To limit tire scrub in the Wall Racer drive arrangement shown, relatively narrow tires are fitted to drive wheels 16 and 18. To improve appearance, and to allow operation on thick carpets and the like, wider supplemental tires of slightly lesser diameter and formed of a lightweight foam or the like (not shown) can be assembled to the outer surfaces of drive wheels 16 and 18.

FIGS. 3 and 4 show a second embodiment of the Wall Racer; this embodiment appears likely to correspond to the earliest production version of the Wall Racer. FIG. 12 provides detailed dimensional information concerning this embodiment, and preproduction specifications are provided below as well.

As shown by FIG. 3, in this embodiment two exhaust fans 38 are provided, spaced laterally from another on the transverse centerline of the chassis 40, and each fan being driven by a motor 39 with the fan mounted directly on the motor shaft. Six drive wheels 42 are provided, three on either side of the chassis 40, with the three wheels 42 on either side of the chassis being geared (or belt-driven) to one another so as to be driven in common by two separately radio-controlled motors. The radio control receiver and battery are not shown, as being generally within the skill of the art. FIGS. 5, 6, and 7 (discussed below) show a preferred gear train and motor arrangement. Thus, as in the FIG. 1 embodiment, steering is accomplished by differentially driving the wheels on either side of the chassis 40. As shown, skirts 44 are again provided, so as to ensure that the airflow is primarily from the ends of the chassis to the fan exhaust duct 46, in turn to ensure that an adequate area of high-velocity, low-pressure air flow is provided to generate adequate downforce. As illustrated by FIG. 4, the center pair of wheels are slightly lower in the chassis than the end pairs, so as to provide "teeter" and ensure that the center pair of drive wheels are always in good contact with the wall W.

The pairs of wheels 42 at each end of the chassis are slightly proud of (i.e., extend slightly beyond) the respective ends of the chassis, so that as the vehicle approaches a wall while operating on a floor, the wheels contact the wall first. Thus providing the six-wheel arrangement of this embodiment allows the Wall Racer to make the transition from floor to wall in either direction. So that downforce urging the Wall Racer toward the floor does not prevent the Wall Racer from initially climbing the wall, the fans 38 are only energized when the chassis 40 reaches a predetermined inclination with respect to the horizontal. FIG. 13 shows a preferred switch, and FIG. 13A a circuit, for controlling the fans accordingly.

As indicated above, FIGS. 5, 6, and 7 show a preferred arrangement of the two drive motors and corresponding gear trains for differentially driving the six wheels of the Wall Racer in its FIGS. 3 and 4 embodiment. FIG. 5 shows a plan view, and FIGS. 6 and 7 cross-sectional views along lines 6-6 and 7-7 respectively. Thus, assuming the Wall Racer is traveling toward the right in FIG. 5, so that the upper side of the drawing is the "left", and the lower the "right", there are provided left-side and right-side drive motors 150 and 152 respectively. Motors 150 and 152 each drive reduction gear trains, 154 and 156 respectively; the gears of each are idlers, that is, spin freely on shafts 158, so that gears from both trains can be supported on the same shafts 158 while turning independently of one another. The output gears of train 154 and 156 drive gears 160, 162 respectively, which are fixed with respect to sleeve axles 164, 166 respectively, riding on a fixed axle 168, and thence to gears 170, 172 respectively. Gears 170, 172 are fixed to corresponding drive wheels 174, 176, and also drive further gear trains 178, 180, which drive central drive gears 182, 184, which are fixed to central drive wheels 186, 188. Central drive gears 182, 184 also drive further gear trains 190, 192; these in turn drive gears 194, 196, to which are fixed wheels 198, 200. Implementation of this drive arrangement is within the skill of the art; while the gear trains and axles are shown as mounted on a metallic frame 202, in production this chassis will typically comprise molded components.

As mentioned, FIG. 12 shows a detailed view of the underbody venturi duct 50 formed between the undersurface of chassis 40 and a juxtaposed surface, such as a wall W. This embodiment of the underbody was employed in one successfully-tested version of the second embodiment of the Wall Racer of the invention, as shown in FIGS. 3 and 4. FIG. 12 further provides reference to dimensional details of the chassis 40. In this version, the overall chassis length H is 11.828", with six wheels of 2.524" diameter; the wheelbase F of the outer pairs of wheels is 9.50", so that the wheels are proud of the chassis, i.e., extend slightly beyond the end of the chassis 40, in order to engage a vertical surface and thus enable the Wall Racer to climb a wall from the floor. The center axle is 0.050" closer to the wall W than the end pairs of wheels, so that the desired "teeter" is provided.

The underbody venturi duct 50 is longitudinally symmetric about a centerline J, with one end only shown in detail by FIG. 12. As shown in detail by FIG. 12, each "half" of the underbody duct 50 formed between the undersurface of the chassis 40 and the wall W comprises an entry portion 50*a*, a transition portion 50*b*, and an exit portion 50*c*, which makes a smooth transition into a fan duct 46, also of venturi shape, in which the fan(s) are located. Air enters each half of the underbody venturi duct at an inlet opening at the periphery of the chassis 40, defined by the entry portion 50*a* of underbody venturi duct 50. Entry portion 50*a* is defined by a radius R formed on the end of the chassis; in the version shown, this radius is 1.164". The axles of the front and rear pairs of wheels lie on the center of this radius, and are slightly larger in radius, so that each tire's rolling surface is somewhat proud of the chassis end, as noted. Entry portion 50*a* is faired into and connects smoothly with an extended flat transition portion 50*b* formed by a flat surface on the underside of the chassis; since the duct 50 formed between the underside of chassis 40 and the wall is of minimum cross-sectional area in this region, the maximum air flow velocity, and accordingly the maximum downforce per unit area, are developed here.

The goal in designing the underbody venturi duct 50 is to maximize the extent of the region of minimum cross-sectional area, while optimizing its cross-sectional dimension, so as to provide smooth, preferably non-turbulent flow into and out of this region, all in order to maximize flow velocity. To ensure smooth flow, the section of the undersurface of chassis 40 defining the upper bound of entry portion 50*a* is radiused, and the corresponding section defining the upper bound of exit portion 50*c* describes a portion of an ellipse. In the successfully-tested version depicted, this elliptical contour was drawn using a 2"×4" ellipse as found on a draftsman's "30-degree" template; that is, dimensions D and C are 1" and 2", respectively. As illustrated, then, the extent E of flat portion 50*b* is 2.25" long, forming a "tunnel flat". With the vehicle balanced on the center pair of wheels, so that the flat portion 50*b* is parallel to the wall, the ground clearance G therebetween is 0.098". Flat portion 50b makes a smooth transition to exit portion 50c, which as noted is 2.00" long and elliptical in longitudinal cross-section. Exit portion 50c in turn makes a smooth transition to a central venturi section 46a of fan duct 46, in which the fan(s) are located. In the two-fan embodiment of FIGS. 3 and 4 and detailed in FIG. 12, the longitudinal dimension B of the narrowest portion of this venturi section 46a is 1.00"; section 46a extends across the chassis 50 so as to form a transverse "mail slot". As it extends away from the wall, the mail slot section 46a then broadens out gradually in the longitudinal direction and is divided along the longitudinal centerline to form two circular-section ducts 46b in which the fans 38 are located; their diameter, dimension A, is 1.625".

The following are the principal specifications of a successfully-tested version of the Wall Racer, as shown in FIGS. 3 and 4 and dimensioned as in FIG. 12:

Wheelbase (dimension F) 9.5" (front to rear axle)
Track width 5.8" (centerline to centerline, at contact points)
Underbody duct width 4.9" (between skirts)
Chassis weight 584 g.
Body weight 29 g.
Total weight 613 g.
Weight distribution (without body, center axle unsupported):
Front axle 260 g (44.5%)
Rear axle 324 g (55.5%)
Ground clearance (dimension G) 0.098"
Motor voltage 6 v. nominal (five 1.2 v. 1000 mah NiMH cells)
Downforce fans current draw 4 amperes total
Ducted fans (two)—1.625" diameter, 3 blades
Total net downforce 1280 g.
Teeter (center axle offset) 0.050"
Fan RPM 30,000

The chassis itself can be molded of a lightweight foam material, having its undersurface shaped to define the venturi duct 50 in cooperation with the surface of the wall W. It is convenient to mount the components, such as bearings for the axles carrying the wheels, drive motors and gear or belt drive components, radio control receiver, batteries, and motor and fan assemblies, in recesses molded into the foam of the chassis. In particular, the fan assemblies may alternatively comprise hard plastic molded ducts within which the fan and drive motor are retained; the exit portion of the underbody venturi duct is then shaped to mate smoothly therewith.

In a sucessfully-tested prototype, the skirts 44 (FIG. 3) were formed of "Tyvek" envelope material sized and located so as to curve outwardly at a nominal 45 degrees when in contact with the wall; a stiffening strip of plastic glued to the lower edge of the Tyvek skirts, but spaced slightly therefrom, may be desirable to prevent local buckling.

Given the above detailed disclosure of the invention, those of skill in the art would have no difficulty in its practice. In particular, it will be appreciated that batteries (exemplary specifications being provided above) must be provided to power the fans and the drive wheels, that the drive wheels, three on each side in the embodiment of FIGS. 3 and 4, must be linked to one another and to the respective drive motor by gears, as illustrated in FIGS. 5, 6, and 7, or by belts or other means, and that the motors must be individually controllable by signals provided by an operator by way of a radio transmitter and receiver pair. These aspects of the implementation of the invention are within the skill of the art. It is also within the scope of the invention to drive each of the six wheels individually, that is, to eliminate the gear or belt arrangement in favor of separate motors for each wheel, but this alternative is considered undesirable as it would involve a weight penalty.

Figure 8:
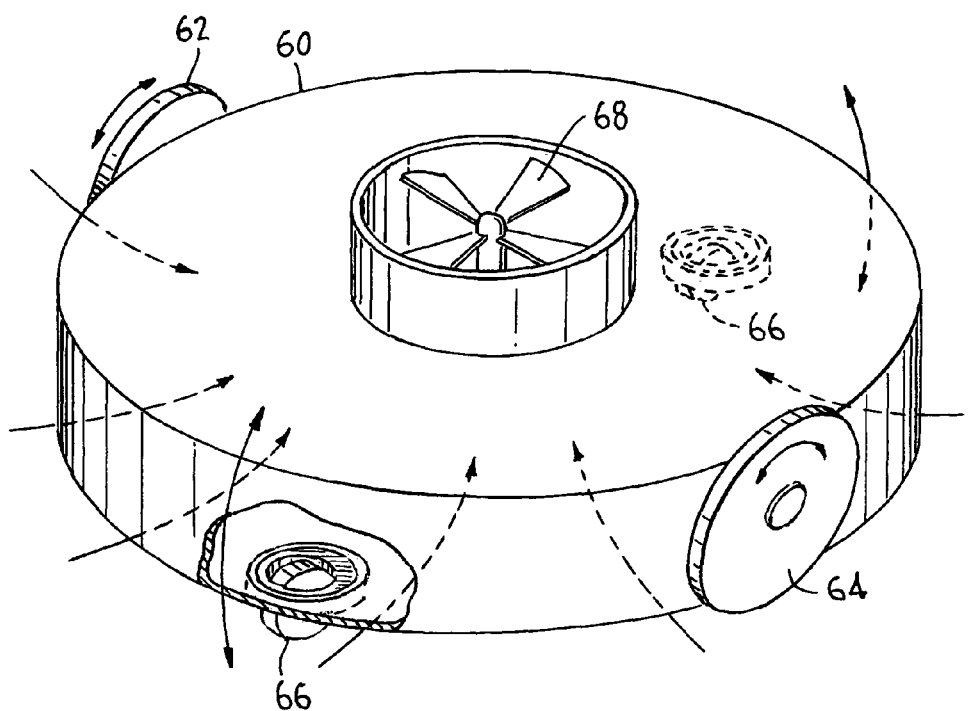
FIG. 8 and FIG. 9 show respectively a perspective view and an elevation in partial cross-section of a third embodiment of the Wall Racer.
Figure 9:
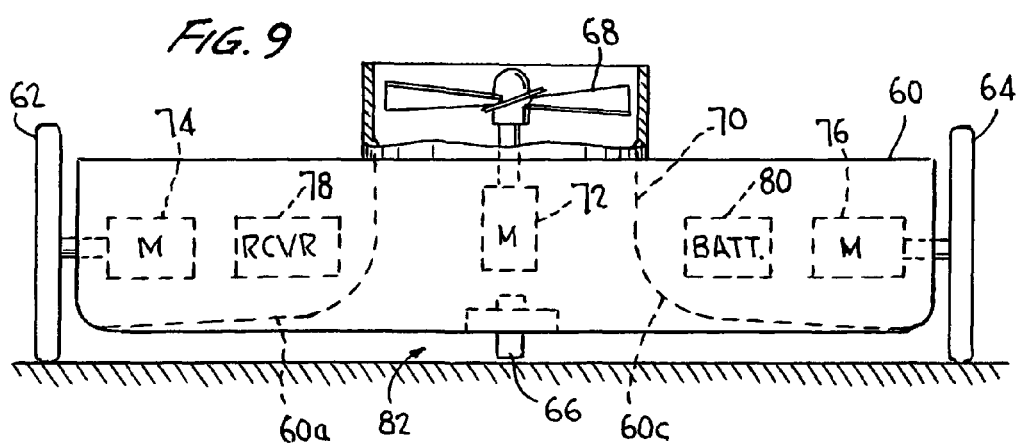

FIGS. 8 and 9 show as mentioned a third version of the Wall Racer, in this case with a circular chassis 60 to provide a "flying saucer" appearance. In this version, two drive wheels 62 and 64 are provided on diametrically opposed points on the chassis 60, with casters 66 on opposite sides, along a line perpendicular to the axis of the drive wheels 62 and 64. The casters may be raised slightly from a plane including both drive wheels and the casters, to provide "teeter" as above. (It will be apparent that this version of the Wall Racer cannot negotiate the transition between floor and wall.) Downforce is provided by a centrally-located fan 68 disposed in a venturi duct 70 and driven by a motor 72. Drive wheels 62 and 64 are individually driven by motors 74 and 76 responsive to control signals from a radio-control receiver 78 and powered by battery 80.

In this version, as mentioned above, the exhaust duct 70 is equidistant from all points on the periphery of chassis 60, so that the inward air flow path is of equal length at all points around the chassis 60. Hence there is no need for skirts, and the air flow is radially inward all around the periphery. Again, a radius is provided around the periphery of the lower edge of chassis 60, as illustrated at 60b, so that the inlet opening of the underbody venturi duct extends cicumferentially around the chassis, and a large-radius or elliptical transition portion 60c is provided where the underbody duct 82 meets the exhaust duct 70, to ensure smooth and substantially non-turbulent airflow. The transistion portion of the underbody duct 82 formed between the underside 60a of chassis 60 and the wall is preferably of shallow conical shape in section, as illustrated, so that the cross-sectional area of the duct 82 stays constant as its radius from the center of exhaust duct 70 varies; in this way the velocity of the inward-flowing air stream and the differential pressure exerted thereby are both substantially constant, so that the downforce is exerted evenly at substantially all points on the chassis 60, that is, outside of duct 70.

FIGS. 10 and 11 show a further version of the Wall Racer, again having an elongated chassis 90 suitable for mounting of a model race car body or the like. In this embodiment, a single fan 92 is located centrally on the chassis, is driven by a motor 94, and is disposed within an exhaust duct 96 communicating with an underbody venturi duct 98 formed between the underside of chassis 90 and the wall W. The underbody duct 98 is designed generally as discussed above with respect to FIG. 12.

In this embodiment, a single drive wheel 100 driven by a motor powered by a battery and responsive to control signals provided by a radio control receiver (none of the unnumbered components being shown) is located on the vehicle's longitudinal centerline, near the center of effort of the downforce, but disposed toward one end of the chassis so as not to interfere with the exhaust duct 96. Two casters 102 and 104 are mounted at the opposite end of the chassis 90. Caster 102 is free to pivot about an axis perpendicular to wall W, while caster 104 is also pivoted about a similarly perpendicular axis, but only between angular limits (see FIG. 14A, below).

Thus, chassis 90 rests on a tripod comprising drive wheel 100 and casters 102 and 104. If drive wheel 100 is driven so as to propel the vehicle toward the direction of the end of the chassis on which drive wheel 100 is disposed, that is, rightwardly in FIG. 11, the casters trail behind, and the vehicle travels in a straight line; if drive wheel 100 is driven in the opposite direction (counterclockwise in FIG. 11), the caster 104 provided with angular stops rotates about the axis perpendicular to wall W until its pivoting is stopped at one or the other of its angular limits, so the vehicle turns in one direction until the direction of travel is reversed. Hence directional control of the Wall Racer in this embodiment is substantially constrained; being greatly simplified, this embodiment might be best suited to a low-cost version of the invention.

Figure 14:
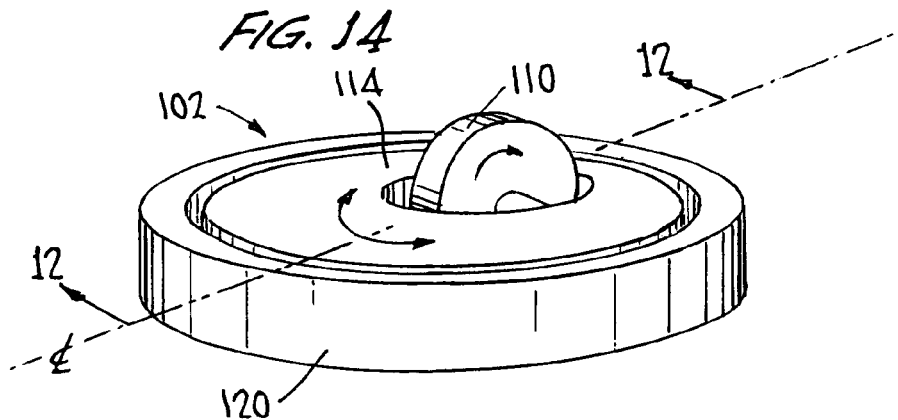
Figure 14A:
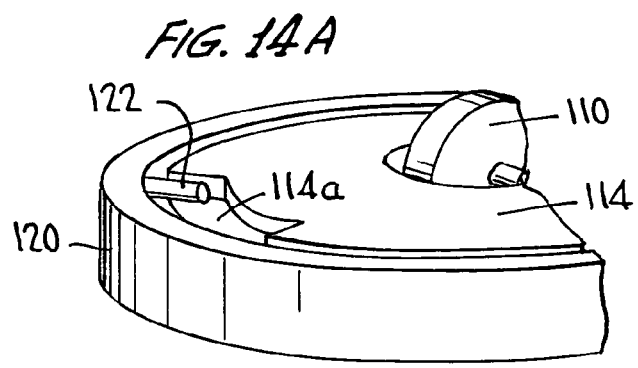
FIG. 14A shows a partial view corresponding to FIG. 14, illustrating a optional variation.
Figure 15:
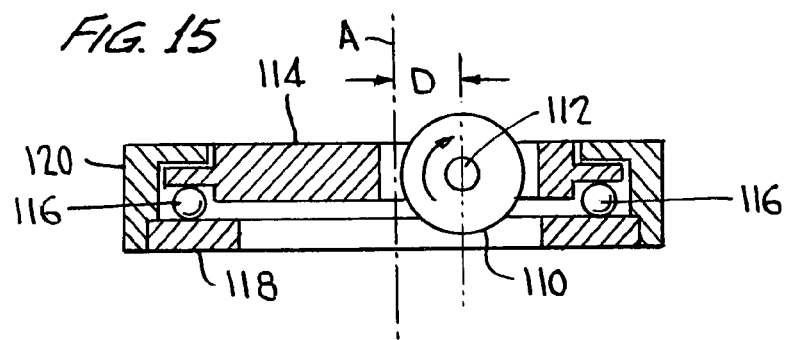
Figure 16:
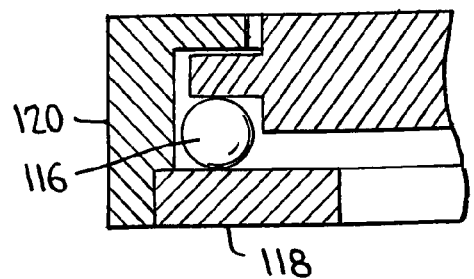

As mentioned, FIGS. 14-16 show respectively a perspective view, a cross-section, and an enlarged partial cross-section of a caster 102 used in several of the embodiments of the Wall Racer, while FIG. 14A shows a partial view corresponding to FIG. 14, illustrating a optional variation. In these views, the caster 102 is shown inverted, that is, with its face which would be juxtaposed to wall W oriented "up" in the drawings. A roller 110, which contacts wall W, is carried by an axle 112 that is mounted for rotation in a rotating plate 114; plate 114 rotates about an axis A perpendicular to but offset from that defined by axle 112. In the embodiment shown, rotating plate 114 in turn rides on a number of balls 116, which bear against a closure ring 118; closure ring 118 is secured to a frame 120, which can be mounted to the chassis. Thus, roller 110 engages the wall, and rotates about axle 112 as the vehicle is maneuvered; the assembly of roller 110, axle 122 and plate 114 can rotate with respect to frame 120 and thus with respect to the vehicle chassis, as the latter is steered. The axle 112 is offset with respect to the axis A about which plate 114 rotates, so that as the vehicle is steered, plate 114 rotates and roller 110 trails the axis A of rotation of plate 114.

If it is desired to restrict the rotation of plate 114, e.g., as discussed above with respect to the version of the Wall Racer shown in FIGS. 7 and 8, so as to provide some turning, albeit not precisely controlled, this can be accomplished as shown, for example, in FIG. 14A. As illustrated, a pin 122 extends through and is retained in the upper flange of frame 120 and fits within an angular recess 114a formed in the upper surface of rotating plate 114, limiting the degree of rotation about axis A that is permitted to plate 114.

Finally, as mentioned, in the embodiments of the Wall Racer in which it is capable of operation on a floor and climbing onto a wall (that is, the embodiment of FIGS. 3-7), it is desired to provide a switch that actuates the exhaust fan(s) only when the Wall Racer reaches a desired angle, typically between 30 and 60 degrees with respect to the horizontal, so that downforce does not prevent the vehicle from beginning to climb the wall as the wheels engage the wall's surface. FIG. 13 shows a switch 128 for so doing, and which also de-energizes the fan if the Wall Racer is placed upside-down, against a ceiling; this may be preferred for safety reasons, so that the Wall Racer cannot fall on anyone. FIG. 13A shows a typical circuit in which switch 128 may be used.

Switch 128 comprises a conductive metal ball 130 disposed within a hollow switch body 132. Body 132 is symmetrical about a vertical axis, and defines a generally frusto-conical lower portion 132a, in which ball 130 rests when the vehicle is on the floor, as shown in full, a disc-shaped central portion 132b, into which the ball falls, as indicated in dotted lines, when the vehicle begins to be oriented vertically, as when it begins to climb a wall, and a generally frusto-conical upper portion 132c, in which ball 130 falls if the Wall Racer is placed inverted against a ceiling. Conductive contacts 134 are disposed on the inner surfaces of lower portion 132a and upper portion 132c, so that when ball 130 is disposed in either the upper or the lower portions, it connects the contacts 134.

As shown in FIG. 13A, contacts 134 (two of which are connected in common) are wired in series with a normally-open relay 140 and battery 28, which controls a circuit including battery 28 and fan motor 39. Thus, with switch 128 closed, that is, with the Wall Racer essentially horizontal, and ball 130 making the connection between contacts 134, relay 140 is closed, as shown; when the Wall Racer leaves the horizontal sufficiently that ball 130 falls out of lower section 132a, into upper section 132b, relay 140 opens, closing the motor circuit and energizing motor 39, so as to drive fan 38. In this embodiment, if the Wall Racer is placed inverted against a ceiling, ball 130 falls into upper portion 132c, similarly connecting contacts 134, and preventing operation of fan motor 39.

While several preferred embodiments of the invention have been disclosed herein in detail, the invention is not to be limited by the disclosed embodiments, which are exemplary only.

What is claimed is:

1. A battery powered, remotely-controlled toy vehicle configured for operation on a substantially flat horizontal, vertical, and ceiling-like surface, comprising:

a chassis having an undersurface and having flexible skirts extending along long sides of the chassis to provide a partial seal between the undersurface of the chassis and the surface;

at least one wheel mounted on and cooperating with said chassis so as to support said chassis with respect to the substantially flat surface against which said at least one wheel bears, such that the undersurface of said chassis is maintained at a predetermined distance from said surface, a receiver responsive to a control signal from a remote transmitter, a battery, a first drive motor being supplied with current from said battery responsive to signals provided from said receiver, at least one of said at least one wheel being controllably driven by said first drive motor, a second fan drive motor, also being supplied with current from a battery, and a fan driven by said second motor, said fan being mounted in a fan duct extending through said chassis and arranged generally orthogonally with respect to said surface, so as to draw a stream of air from between said undersurface of said chassis and said surface, wherein said undersurface of said chassis is shaped so that when said vehicle is placed on a surface with said at least one wheel in contact with said surface, said undersurface and said surface together define an underbody venturi duct, said underbody venturi duct extending from an entry portion at the periphery of said undersurface to said fan duct, whereby differential pressure between said stream of air flowing in said underbody venturi duct and the ambient air induces downforce urging said chassis toward said flat surface; and wherein the underbody venturi duct defined by said undersurface and said flat surface comprises (1) the entry portion extending between an inlet opening at the periphery of said underbody and a exit opening, (2) an extended transition portion, of substantially uniform cross-sectional area, joining the exit opening of said entry portion to (3) an exit portion, said exit portion being connected to said fan duct, whereby said fan draws said stream of air flowing freely through said underbody venturi duct, from said inlet opening of said entry portion to and out of said fan duct.

2. The toy vehicle of claim 1, wherein the entry portion of said underbody venturi duct defined by said undersurface and said flat surface includes a relatively large inlet opening at the periphery of said underbody and a relatively small exit opening, said inlet opening and exit opening being connected by surfaces shaped such that the cross-sectional area of said entry portion varies smoothly.

3. The toy vehicle of claim 2, wherein the entry portion of said underbody venturi duct is defined by an at least minimally radiused section of said undersurface of said chassis, extending from said inlet opening to said exit opening.

4. The toy vehicle of claim 2, wherein the exit portion of said underbody venturi duct is elliptical in cross-section, so as to smoothly join said transition portion to said fan duct.

5. The toy vehicle of claim 2, wherein the fan duct comprises an entry section of reduced cross-sectional area, at which said fan duct joins said exit portion of said underbody venturi duct, and a section of larger cross-sectional area in which the fan is disposed.

6. The toy vehicle of claim 1, wherein said at least one wheel comprises a pair of drive wheels disposed substantially opposed from one another on either side of said chassis, and driven differentially by separate motors responsive to signals from said receiver to steer said vehicle.

7. The toy vehicle of claim 6, wherein a pair of casters are provided on said chassis, substantially aligned along a line perpendicular to a line connecting said drive wheels on either side of said chassis.

8. The toy vehicle of claim 7, wherein said casters are disposed such that only one of said casters and said pair of drive wheels can contact a flat surface at any time.

9. The toy vehicle of claim 8, wherein said chassis is generally elongated, with the casters located at either end of the chassis, and the underbody venturi duct extends from either end toward a fan duct located in the center of the chassis, and further comprising flexible skirts extending along the long sides of the chassis to provide a partial seal between the undersurface of the chassis and the surface.

10. The toy vehicle of claim 7, wherein said casters comprise a roller mounted on an axle, the combination of said roller and said axles being journaled for free rotation about a first axis fixed with respect to a plate, said plate in turn being journaled for free rotation about a second axis fixed with respect to a frame, said first axis being perpendicular to the plane of said second axis but offset with respect to said second axis, said frame being adapted to be affixed to the chassis of said vehicle, whereby when said roller is in contact with a surface and said vehicle is driven to move with respect to said surface, said plate rotates so as to align said roller with the direction of motion of said vehicle.

11. The toy vehicle of claim 6, wherein said pair of drive wheels disposed substantially opposed from one another on either side of said chassis are disposed substantially under the center of pressure from the downforce.

12. The toy vehicle of claim 1, wherein said chassis is generally elongated and comprises three pairs of drive wheels, each pair of wheels including a wheel on either side of said chassis, one pair of wheels being located at each end of said chassis and the third pair being located centrally, all of the three drive wheels on either side of the chassis being driven together, but differentially from the three drive wheels on the opposite side of said chassis, and wherein the pairs of wheels at the ends of the chassis are disposed with respect to the chassis and the central pair of wheels such that only one of the end pairs of wheels and the central pair can touch a flat surface simultaneously.

13. The toy vehicle of claim 12, wherein the end pairs of wheels are disposed with respect to the respective ends of the chassis such that they are proud thereof, whereby the end pairs of wheels can engage a surface perpendicular to a surface in contact with one of the end pairs of wheels and the central pair of wheels.

14. The toy vehicle of claim 13, wherein the ends of said chassis between the respective end pairs of wheels are shaped to define a radius slightly less than the radius of said wheels, and are substantially coaxial therewith, said radiused ends of said chassis forming the entry portions of said underbody venturi duct.

15. The toy vehicle of claim 13, further comprising a switch operated as said vehicle climbs from a horizontal to a vertical position, so as to then activate said fan.

16. The toy vehicle of claim 15, wherein said switch comprises a conductive ball confined within a closed container fixed to said chassis, wherein electrical contacts in a circuit controlling operation of said fan motor are located on an interior wall of said container so as to be electrically connected by said ball when said chassis is in a first position with respect to the horizontal, and electrically isolated when said chassis is in a second position with respect to the horizontal.

17. The toy vehicle of claim 1 wherein said chassis is generally elongated, two casters are located at opposite sides of one end of the chassis, the underbody venturi duct extends from either end toward a fan duct located in the center of the chassis, and a single drive wheel is disposed on the longitudinal centerline of the chassis on the side of the fan duct opposite the end of the chassis on which the casters are located.

18. The toy vehicle of claim 17, further comprising flexible skirts extending along the long sides of the chassis to provide a partial seal between the undersurface of the chassis and the surface.

19. The toy vehicle of claim 17, wherein said casters each comprise a roller mounted on an axle, the combination of said roller and said axles being journaled for free rotation about a first axis fixed with respect to a plate, said plate in turn being journaled for free rotation about a second axis fixed with respect to a frame, said first axis being perpendicular to the plane of said second axis but offset with respect to said second axis, said frame being adapted to be affixed to the chassis of said vehicle, whereby when said roller is in contact with a surface and said vehicle is driven to move with respect to said surface, said plate rotates so as to align said roller with the direction of motion of said vehicle, wherein the degree of rotation of said plate of one of said casters is restricted to a predetermined angle of free rotation, whereby when said vehicle is driven in the direction of said casters, the vehicle is steered by the roller of said one of said casters.

20. The toy vehicle of claim 1, wherein two fans are provided, disposed in fan ducts communicating with said underbody venturi duct, both fans being driven by motors to draw a stream of air from an entry opening on the periphery of the chassis of said vehicle, through said underbody venturi duct and out through said fan ducts.

21. A battery powered, remotely-controlled toy vehicle configured for operation on a substantially flat horizontal, vertical, and ceiling-like surface, comprising;
 a chassis having an undersurface and having flexible skirts extending along long sides of said chassis;
 at least one wheel mounted on said chassis and cooperating therewith so as to support said chassis with respect to the substantially flat surface against which said at least one wheel bears, such that the undersurface of said chassis is maintained at a predetermined distance from said surface,
 a receiver responsive to a control signal from a remote transmitter, a battery, a first drive motor being supplied with current from said battery responsive to signals provided from said receiver, at least one of said at least one wheel being controllably driven by said first drive motor, a second fan drive motor, also being supplied with current from a battery, and a fan driven by said second motor, said fan being mounted in a fan duct extending through said chassis and arranged generally orthogonally with respect to said surface, so as to draw a stream of air from between said undersurface of said chassis and said surface, wherein said undersurface of said chassis is shaped so that when said vehicle is placed on a surface with said at least one wheel in contact with said surface, said undersurface and said surface together define an underbody venturi duct extending from at least one inlet opening at the periphery of said undersurface, the undersurface in cross-section defining an entry section, an extended transition section, and an exit section, whereby the cross-sectional area of said underbody venturi duct varies smoothly from an inlet opening to a reduced area extended transition section, and thence to an exit section in communication with said fan duct, whereby differential pressure between said stream of air flowing in at least said transition portion of said underbody venturi duct and the ambient air induces downforce urging said chassis toward said flat surface.

22. The vehicle of claim 21, wherein said chassis is radially symmetric about said tan duct, such that said inlet opening extends circumferentially around said chassis, wherein the extended transition section of the undersurface in cross-section is inclined with respect to the flat surface, whereby said reduced area transition portion of the underbody venturi duct is conical in cross-section so that the cross-sectional area thereof is substantially constant over its radial extent thereof, so that the velocity of the air stream flowing therethrough is substantially constant.

23. The vehicle of claim 21, wherein said chassis is elongated, being symmetric about a transverse axis on which the fan duct is disposed, and having opposed ends at which inlet openings for symmetric underbody venturi ducts are formed, and wherein said extended transition section of the undersurface in cross-section is parallel with respect to the flat surface, so that the cross-sectional areas of the transition portions of the underbody venturi ducts thus defined are constant.

24. The vehicle of claim 21, wherein said at least one wheel comprises a pair of drive wheels disposed substantially opposed from one another on either side of said chassis substantially under the center of pressure from the downforce, and driven differentially by separate motors responsive to signals from said receiver to steer said vehicle.

* * * * *